United States Patent [19]

Meier et al.

[11] Patent Number: 4,940,755

[45] Date of Patent: Jul. 10, 1990

[54] THERMOPLASTIC MOULDING COMPOSITIONS BASED ON POLYVINYL CHLORIDE AND A POLY-α-OLEFINE/POLYURETHANE BLOCK COPOLYMER

[75] Inventors: Lothar Meier, Sprockhoevel; Maria Gärtner, Bergisch-Gladbach; Kurt P. Meurer, Koenigswinter; Joachim Franke; Christian Lindner, both of Cologne, all of Fed. Rep. of Germany

[73] Assignee: Bayer Aktiengesellschaft, Fed. Rep. of Germany

[21] Appl. No.: 292,261

[22] Filed: Dec. 30, 1988

[30] Foreign Application Priority Data

Jan. 13, 1988 [DE] Fed. Rep. of Germany ....... 3800684

[51] Int. Cl.$^5$ ...................... C08L 53/00; C08L 75/04
[52] U.S. Cl. ........................................ 525/90; 525/131
[58] Field of Search .................................. 525/90, 131

[56] References Cited

U.S. PATENT DOCUMENTS 3,432,451  3/1969  Kales ................................... 525/131
3,483,276  12/1969  Mahlman ............................ 525/131
4,212,957  7/1980  Hirzy ................................... 525/131

FOREIGN PATENT DOCUMENTS 3622825  1/1988  Fed. Rep. of Germany .
909704  10/1962  United Kingdom .

Primary Examiner—John C. Bleutge
Assistant Examiner—Vasu S. Jaqannathan
Attorney, Agent, or Firm—Connolly and Hutz

[57] ABSTRACT

This invention relates to thermoplastic moulding compositions of PVC and poly-α-olefine/polyurethane block copolymers and poly-($C_2$-$C_{10}$-α-olefines) which have been functionalized in relation to isocyanate groups, preferably polypropylene, di- or higher polyisocyanates or isocyanate prepolymers and optionally relatively high molecular weight polyols and/or low molecular weight chain lengthening agents.

2 Claims, No Drawings

THERMOPLASTIC MOULDING COMPOSITIONS BASED ON POLYVINYL CHLORIDE AND A POLY-α-OLEFINE/POLYURETHANE BLOCK COPOLYMER

This invention relates to thermoplastic moulding compositions of PVC and poly-α-olefine/polyurethane block copolymers and poly-($C_2$-$C_{10}$-α-olefines) which have been functionalised in relation to isocyanate groups, preferably polypropylene, di- or higher polyisocyanates or isocyanate prepolymers and optionally relatively high molecular weight polyols and/or low molecular weight chain lengthening agents.

PVC, as is well known, is modified with certain modifiers, plasticisers and additives to give rise to thermoplasts suitable for many different applications. Soft PVC moulding compositions may be obtained, for example, by using certain plasticisers such as polyadipates, polyphthalates, thermoplastic polyurethanes. These plasticisers generally have no tendency to migrate.

It has now been found that block copolymers according to this invention are miscible and compatible with PVC and the mixtures form soft, cold resistant moulding compounds with high tear propagation resistance. These moulding compounds are resistant to oils, fats and petroleum hydrocarbons and bitumen as well as to extraction, migration and abrasion and are non-volatile.

The properties of the moulding compounds may be adjusted as required by varying the composition of the block copolymers and the proportions in which they are mixed with PVC. It is thereby possible to obtain, for example, materials for films with high strength and elongation which can be processed by calandering and/or slush moulding.

The present invention therefore relates to thermoplastic moulding compounds of PVC and a block copolymer, characterised in that the block copolymer is a poly-α-olefine/polyurethane block copolymer (PAO/PU) and is prepared from A. isocyanate reactive, functionalised poly($C_2$-$C_{10}$-α-olefines) having a molecular weight $M_w$ of from 1000 to 350,000, B. organic di- or poly-isocyanates or modified polyisocyanates and isocyanate prepolymers, preferably with functionality 2, and optionally C. known isocyanate reactive starting materials for polyurethane/polyurea syntheses containing Zerewitinoff active hydrogen atoms, such as polyether polyols, polyester polyols, polycarbonate polyols, polylactones and modified compounds containing amino groups, most preferably difunctional compounds, and optionally D. low molecular weight compounds in the molecular weight range of from 62 to 399 functioning as chain lengthening agents, such as organic di- or polyhydroxyl compounds as well as di- and oligo-functional amines in the molecular weight range of from 32 to 399 which may function as chain lengthening agents or cross-linking agents, the reaction mixture containing at least one of the components C and D.

The isocyanate reactive, functionalised poly(α-alkyl)-olefines (PAO) mentioned under A. which have a weight average molecular weight $M_w$ of from 1000 to 350,000, preferably from 2000 to 200,000, in particular from 2000 to 100,000, are polyolefines, in particular on the basis of polypropylene, which contain functional groups capable of reacting with isocyanate groups. A survey may be found, for example, in Houben-Weyl, Supplementary Volume 4, pages 768 to 784. These functionalised PAO compounds are preferably poly(α-alkyl)-olefine carboxylic acids, carboxylic acid anhydrides, alcohols or amines. The olefine groups in A. should generally contain 2 to 10 carbon atoms, preferably 1 carbon atom.

Functionalised PAOs are known in principle. Thus polypropylenes containing carboxylic acid groups may be obtained according to U.S. Pat. Nos. 3 416 990, 3 437 550 and 3 483 276 by modifying crystalline or amorphous polypropylene with an ethylenically unsaturated carboxylic acid, polycarboxylic acid or anhydride or polycarboxylic acid amide or alkyl ester.

The following are examples of such acids or anhydrides: maleic acid, fumaric acid, itaconic acid, acrylic acid, methacrylic acid, crotonic acid, maleic acid anhydride and itaconic acid anhydride.

Maleic acid anhydride is preferably used so that maleated amorphous or isotactic polypropylene may be obtained.

Hercoprime ® G (trade product of Hercules Inc., Bloomington, Del. 19899) is an example of a crystalline, carboxylated polypropylene polymer which may be used for this invention.

Epolene ® E 43 (trade product of Tennessee-Eastman Company, Tennessee) is an example of an amorphous carboxylated polypropylene polymer.

Another method of obtaining functionalised polyolefines is described in German Patent Application P 36 18 378.4.

The last mentioned Patent Specification describes a process for the preparation of poly-($C_2$-$C_{10}$-α-alkyl-olefine)dicarboxylic acids with molecular weights $M_w$ of from 70,000 to 350,000, preferably from 70,000 to 100,000, especially from 70,000 to 80,000, in which poly-($C_2$-$C_{10}$-α-olefines) with molecular weights $M_w$ of about 355,000 and a non-uniformity of about 10 (non-uniformity $U = M_w/M_n - 1$) are treated oxidatively at temperatures from 200° C. to 300° C. and optionally degraded.

For example, 6000 g per hour of isotactic polypropylene having a molecular weight $M_w$ of 355,000 and a non-uniformity ($U = M_w/M_n - 1$) of 9.4 may be introduced into an extruder (ZSK 32) having a length/diameter ratio of LD=40 and heated to 250°-260° C. and mixed with 1500 NL/h of air under pressure, the cylinder temperature of the extruder being kept at 210° C. downstream of the zone of air inlet ($M_w$ = weight average molecular weight; $M_n$ = number average molecular weight).

The excess air is discharged from the degasification zone and the polypropylene carboxylic acid obtained is spun from the nozzle. After this first oxidation, the polypropylene carboxylic acid obtained has a (weight average molecular weight) $M_w$ of about 113,000, a non-uniformity of 4.17 and a carboxyl group content of 0.7 carboxyl groups per molecule.

This product may be oxidatively extruded again in the same manner, the resulting polypropylene carboxylic acid then having a $M_w$ of 94,000, a non-uniformity of 3.1 and a carboxyl group content of 1.3 carboxyl groups per molecule.

This product may be oxidatively extruded a third time, the resulting polypropylene carboxylic acid then having a $M_w$ of 70,000, a non-uniformity of 4.3 and a carboxyl group content of from 1.5 to 2 carboxyl groups per molecule.

The carboxyl groups are determined in each case by acidimetric titration with a methanolic potassium hydroxide solution.

(The term "NL/h" air stands for standard liters per hour.)

The pressures employed for oxidative extrusion are preferably from 1 bar to 100 bar.

These oxidation processes according to Patent Application P 36 18 378.4 for producing polyolefine carboxylic acids may also be carried out in a kneader at temperatures from 150° to 300° C. and with reaction times of from 1 to 1000 min, preferably from 10 to 1000 min, and air throughputs of 10 to 1000 l/h at pressures from 1 to 100 bar.

The cited application also has as its object another proposed process for the preparation of poly($C_2$-$C_{10}$-(α-alkyl)-olefine)-carboxylic acids, characterised in that $C_2$-$C_{10}$ olefines are polymerised in known manner with the aid of known organometallic mixed catalysts such as V(acetylacetonate)$_3$/Al(Cl) ($C_2H_5$)$_2$ to molecular weights $M_w$ of about 50,000 to about 350,000 and the polymerised product is then treated with $CO_2$ at temperatures from −50° C. to −70° C. for 6 to 20 hours under a $CO_2$ pressure of up to 5 bar and the reaction mixture is then acidified with aqueous acid and the resulting polyolefine carboxylic acid is separated off.

These PAO carboxylic acids or PAO carboxylic acid anhydrides may now be directly reacted with isocyanate groups.

The principle of reacting isocyanate groups with low molecular weight carboxylic acids or carboxylic acid anhydrides is already known and has been described e.g. by R. L. Zapp, G. E. Serniuk and K. S. Minckler in Rubber Chem. Technol. 43, 1154 (1970); S. Motoki, T. Saito and H. Kagami in Bull. Chem. Soc. Jpn. 47, 775 (1974) and C. Naegli and A. Tyabij in Helv. Chim. Acta. 17, 931 (1934).

The reaction products obtained vary according to the reaction conditions and may be either hydroxamic acid anhydrides (formula I)

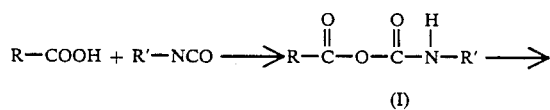

(I)

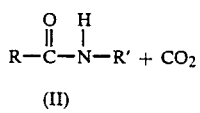

(II)

or compounds of formula II which are obtained if the reaction is accompanied by evolution of $CO_2$ and amide linkage.

The reaction of functionalised PAO with mono or polyisocyanates or isocyanate prepolymers to PAOs containing isocyanate groups and the resulting formation of PAO/PU block copolymers having the properties advantageously obtainable according to the invention is not new.

The above mentioned PAO carboxylic acids or PAO carboxylic acid anhydrides may first be converted into other isocyanate reactive groups by organic chemical reactions which are known per se but have not hitherto been known for this functionalised PAO.

Examples of such reactions include the conversion into alcoholic, amino or epoxide groups, (but these must not be regarded as limiting the present invention).

The carboxylic acid or anhydride groups may be directly converted into other isocyanate reactive groups by oxidation, reduction or transposition or they may be reacted with other low molecular weight or relatively high molecular weight, at least bifunctional compounds corresponding to the general formula

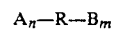

wherein

R denotes an organic group, e.g. an aliphatic, aromatic or aliphatic-aromatic alkyl, aralkyl or aryl group with a molecular weight of from 14 to 1000

A denotes a functional group which is capable of a reaction with carboxylic acid groups or anhydride groups, e.g. hydroxyl or amino groups, leading to the formation of ester, amide or imide bonds, B denotes a functional group capable of a reaction with isocyanate groups. (A survey may be found e.g. in Houben-Weyl E 4, pages 768 to 784. This functional group is preferably a hydroxyl, amino, thio or epoxide group.)

$n \geq 1$ and $m \geq 1$.

Examples of such compounds include diols and polyols and/or amino alcohols, such as ethylene glycol, butane diol-(1,4), 2,2-dimethylpropane diol-(1,3), ethanolamine, diethanolamine.

For a successful reaction, it may be necessary to increase the reactivity of the polyolefine-carboxylic acid groups. Various activating agents known and used in organic chemistry may be used for this purpose. The conversion into carboxylic acid halides is preferred, especially into carboxylic acid chlorides.

These polyolefine-carboxylic acid chlorides may be obtained according to the German Application (P 36 18 378) already mentioned above by reacting polyolefine-carboxylic acids which have a number average molecular weight $M_n$ of from 1000 to 350,000 with halogenating agents, preferably chlorinating agents such as thionyl chloride, optionally in an organic solvent, for example in an aliphatic, cycloaliphatic or aromatic solvent.

The organic solvents used are preferably halogenated or alkylated aromatic hydrocarbons such as toluene or chlorobenzene.

In the absence of solvents, halogenation takes place in substance, the carboxylic acid being present as a suspension in the halogenating agent.

Organic polyisocyanates B. suitable for the reaction with the PAO/PU block copolymers A. according to the invention include all organic compounds which have at least two free isocyanate groups. Diisocyanates X(NCO)$_2$ are preferably used, X denoting in particular an aliphatic hydrocarbon group with 4 to 12 carbon atoms, a cycloaliphatic hydrocarbon group with 6 to 15 carbon atoms, an aromatic hydrocarbon group with 6 to 15 carbon atoms or an araliphatic hydrocarbon group with 7 to 15 carbon atoms.

The following are examples of particularly preferred di-isocyanates of this type because they give rise to thermo-plastically processible block copolymers: tetramethylene di-isocyanate, hexamethylene diisocyanate, dodecamethylene di-isocyanate, 1,4-diisocyantocyclohexane, 1-isocyanato-3,3,5-trimethyl-5-isocyanatomethyl-cyclohexane, 4,4′-methylene-biscyclohexyl diisocyanate, 4,4'-diisocyanatodicyclohexyl-propane-(2,2), 1,4-diisocyanatobenzene, 2,4-diisocyanatotoluene, 2,6-diisocyanatotoluene and isomeric mixtures thereof, 4,4'-diisocyanatodiphenylmethane, p-xylylene di-isocyanate and $\alpha,\alpha,\alpha',\alpha'$-tetramethyl-m- and -p-xylylene diisocyanate and mixtures of these compounds.

Higher functional polyisocyanates known in polyurethane chemistry and the known modified polyisocyanates containing, for example, carbodiimide groups, allophanate groups, iso-cyanurate groups, urethane groups and/or biuret groups may, of course, also be used as all or part of the isocyanate component.

The isocyanate reactive polyols containing Zerewitinoff active hydrogen atoms suitable as starting material C. for the preparation of the PAO/PU block copolymers according to the invention may be known starting materials used for syntheses of polyurethane/polyurea chemistry, such as polyether polyols, polyester polyols, polycarbonate polyols, polylactones or modified polyols containing amino groups and having molecular weights from 400 to 5000. Among these compounds, those which are bifunctional are again particularly preferred.

Suitable chain lengthening agents used as starting material D. for the PAO/PU block copolymers according to the invention are in particular organic polyhydroxyl compounds with molecular weights of from 62 to 399.

These starting materials D are most preferably bifunctional chain lengthening agents in the molecular weight range of from 62 to 399, preferably from 62 to 250, whereas trifunctional chain lengthening agents are less preferred although they may be added in minor quantities.

They include, for example, simple polyhydric alcohols such as ethylene glycol, propylene glycol, propane diol-(1,3), butane diol-(1,4), hexane diol-(1,6), trimethylol propane and glycerol. Low molecular weight polyester diols such as, for example, adipic acid-bis-(hydroxyethyl) ester or low molecular weight diols containing ether groups, such as diethylene glycol, triethylene glycol, tetraethylene glycol, dipropylene glycol, tripropylene glycol or tetrapropylene glycol and difunctional or oligo functional amines in the molecular weight range of from 32 to 399 may also be used as chain lengthening agents or cross-linking agents.

Compounds of type C. and D. have been fully described in DE-A 2 832 253, pages 11 to 20.

These PAO/PU block copolymers may be added in any proportions to commercial PVC and give rise to compatible, almost homogeneous moulding compounds.

PAO/PU block copolymers and their preparation are described in DE-OS 3 622 825 but these products have not hitherto been used as modifiers for PVC.

Conventional PVC modifiers may be added to the moulding compounds according to the invention, for example for improving certain mechanical properties or the dimensional stability under heat. Conventional additives for processing PVC may also be added, e.g. plasticisers, fluidizing agents, flame retardants, stabilizers, blowing agents, pigments.

Commercial types of PVC may be used as PVC component according to the invention, preferably those with a K value of from 30 to 100.

Compounding of the moulding compounds according to the invention may be carried out in the usual mixing apparatus employed in PVC technology. The moulding compounds may be prepared by means of rollers, or compression moulds, or by extrusion, injection moulding, calandering or sintering processes, e.g. by slush moulding and other conventional processes, at temperatures in the range of, for example, 150° to 220° C.

EXAMPLES

A. Preparation of the PAO/PU Block Copolymers (e.g. DE-OS 3 622 825)

EXAMPLE 1

Preparation of the polypropylene (PP) carboxylic acids (according to German Patent Application P 36 18 378.4).

6000 g/h of isotactic polypropylene having an average molecular weight of 340,000 are introduced into an extruder (ZSK 32) having a length/diameter ratio of LD=40, heated to 250° to 260° C. and mixed with 1,500 NL/h of air under pressure (NL/h stands for standard liters per hour).

The cylinder temperature of the extruder is kept at 210° C. downstream of the zone of air inlet. Excess air is discharged in the degasification zone and the degraded polypropylene is spun from the dye.

Carboxy-functionalised polypropylene having a molecular weight of about 4000 and a functionality of about 2 is obtained. The acid number is therefore about 28 mg of KOH per g of substance.

EXAMPLE 2

General procedure (according to Table 1)

The polypropylene-carboxylic acid from Example 1 is melted under nitrogen at 150° to 200° C. The given quantity of methane diphenyl diisocyanate is then slowly added at this temperature. Evolution of gas ($CO_2$) is observed but dies down after 30 minutes to 1 hour.

The polyester is added after a further 30 minutes and rapidly stirred in and the mixture is poured into a Teflon vat and then tempered at 120° C. for 2 hours.

TABLE 1a

| PP/PUR Block Copolymer | | | | | |
|---|---|---|---|---|---|
| Polypropylene | | Polyester | | | |
| $M_n$ (g·mol$^{-1}$) | Quantity g | Type | Quantity g | MDI g | PP % |
| 1,900 | 120 | 1 | 1,160 | 164 | 8.3 |
| 2,630 | 1,500 | 4 | 903 | 471 | 52 |
| 1,770 | 240 | 1 | 2,341 | 328 | 8.5 |
| 1,850 | 360 | 1 | 2,291 | 348 | 12 |
| 1,060 | 360 | 1 | 2,060 | 380 | 12.9 |
| 2,600 | 450 | 1 | 2,310 | 343 | 14.5 |
| 2,085 | 240 | 1 | 1,887 | 328 | 9.8 |
| 2,740 | 750 | 2 | 2,150 | 320 | 23.3 |
| 750 | 240 | 1 | 1,485 | 328 | 11.7 |
| 850 | 360 | 3 | 2,620 | 600 | 10.0 |
| 3,800 | 240 | 1 | 3,300 | 450 | 6.0 |
| 3,800 | 240 | 1 | 2,430 | 330 | 8.0 |
| 1,055 | 450 | 3 | 1,640 | 421 | 17.9 |

TABLE 1b

MDI = methanediphenyl diisocyanate
Descriptions of the polyesters:
Type 1: Polyester of adipic acid, hexane diol and neopentyl glycol; $M_n$ = 2000; OH number: 56
Type 2: Polyester of adipic acid and butane diol $M_n$ = 2,250; OH number: 50
Type 3: 20 parts of polyester of Type 1 1 part of bis-(2-hydroxyethoxy)-benzene
Type 4: 10 parts of polyester of Type 2

TABLE 1b-continued $M_n$ = 1 part of butane diol
number average molecular weight (determined by known methods of combining gel permeation chromatography with viscosity measurements)

OH number = mg of KOH per g of substance.

EXAMPLE 3

Similar to Example 2 except that only half the total quantity of methane diphenyl diisocyanate is initially added. The reaction mixture is stirred for about 1 hour at 180° C. after the addition of the polyester and the remainder of the isocyanate is then added and the mixture is rapidly stirred, poured out and tempered.

B. Preparation of PVC-PP/PU Moulding Compounds.

EXAMPLE 4

Mixtures may be prepared, for example, according to the following formulation to test the mechanical properties of any moulding compound according to the invention:
80 to 30 parts of S-PVC (K value 70)
20 to 70 parts of PP/PU block copolymer 2.5 parts of Ba/Zn stabilizer 0.2 parts of E wax (ethylene glycol-bis-montanic acid ester).

Table 2 gives the mechanical values for a mixture using a PP/PU block copolymer having a number average molecular weight $M_n$ of 1900 and consisting of 120 parts by weight of PP, 1160 parts by weight of a polyester of adipic acid, hexane diol and neopentyl glycol having a molecular weight $M_n$ of 2000 and an OH number of 56 and 164 parts by weight of MDI, prepared according to Examples 1 to 3.

The mixtures were homogenised for 10 minutes on mixing rollers at 180° C. and then compression moulded for 10 minutes at 185° C. to form plates.

TABLE 2

| PVC Parts by weight | PP/PU Parts by weight | Shore Hardness A/D DIN 53505 | Ultimate Strength DIN 53455 MPa | Tension at 100% Elongation DIN 53455 MPa | Elongation at Break DIN 53455 % | Tear Propagation Resistance DIN 53515 kN/m | Resistance to Cold DIN 53372 °C. |
|---|---|---|---|---|---|---|---|
| 80 | 20 | 98/73 | 40 | 28 | 140 | 173 | −4 |
| 70 | 30 | 98/72 | 31 | 24 | 208 | 165 | −20 |
| 60 | 40 | 96/46 | 27 | 17 | 340 | 121 | −38 |
| 50 | 50 | 82/28 | 24 | 10 | 407 | 80 | −50 |
| 40 | 60 | 70/22 | 16 | 5 | 518 | 52 | <−50 |
| 30 | 70 | 57/10 | 8 | 3 | 738 | 37 | <−50 |

We claim:
1. Thermoplastic moulding compositions of polyvinyl chloride and a block copolymer, characterised in that the compositions comprise 30–80 weight % polyvinyl chloride and 70–20 weight % of a poly-α-olefine/-polyurethane block copolymer (PAO/PU) and the block copolymer is prepared from
   A. isocyanate reactive, functionalised poly($C_2$–$C_{10}$-α-olefines) having a molecular weight $M_w$ of from 1000 to 350,000,
   B. organic di- or higher poly-isocyanates or modified poly-isocyanates and isocyanate prepolymers, and optionally
   C. isocyanate reactive compounds containing Zerewitinoff active hydrogen atoms with molecular weights of from 400 to 5000, and optionally
   D. low molecular weight compounds in the molecular weight range of from 62 to 399 functioning as chain lengthening agents or difunctional and oligo functional amines in the molecular weight range of from 32 to 399 as chain lengthening agents or crosslinking agents,
the reaction mixture containing at least one of the components C and D.
2. A molded article containing the molding composition defined in claim 1.

* * * * *